Patented July 6, 1937

2,086,386

UNITED STATES PATENT OFFICE 2,086,386

COUGH DROP AND PROCESS OF MAKING IT

Edward C. Merrill, West Roxbury, Mass., assignor to United Drug Company, Boston, Mass., a corporation of Delaware No Drawing. Application July 7, 1934, Serial No. 734,213

7 Claims. (Cl. 167—82)

This invention relates to a new and improved product and also the method for securing the local beneficial action of acetyl salicylic acid in the treatment of affections of the mouth and throat.

My invention relates more particularly to the incorporation of acetyl salicylic acid in a molten mass, consisting of sucrose or other sugars, singly or in combination, which mass has been cooked to a point where it is practically free from moisture.

I have discovered that when acetyl salicylic acid is incorporated in such a molten mass, at a temperature below the decomposition point (248° F.) of acetyl salicylic acid, and at a temperature sufficiently high (approximately 200° F.) to permit easy physical admixture in the melt, that the acetyl salicylic acid is retained, without hydrolysis or decomposition, in a practically dry form.

A medicated cough drop prepared in accordance with my invention, liberates, when sucked or dissolved in the mouth, true acetyl salicylic acid in direct contact with the mouth tissues, and which, by the act of swallowing, comes into contact with the throat tissues. The period of contact is prolonged by the adhesive character of the dissolved sugar, which also exerts a beneficial effect by reason of its demulcent and protective properties. The acetyl salicylic acid which is swallowed when prepared in accordance with my invention, exerts the well-known systemic action of acetyl salicylic acid which is commonly prescribed for the internal treatment of throat and mouth disorders.

By the use of my invention certain great benefits and improvements are secured, as above outlined.

Acetyl salicylic acid ester in contact with water or solution of sugar and water tends to hydrolize rapidly or break down and form the ultimate by-products of acetic and salicylic acids. By reason of the fact that acetyl salicylic acid in direct contact with water rapidly hydrolizes or decomposes into acetic and salicylic acids which are irritant to the mouth and throat tissues, direct so-called solutions of acetyl salicylic acid for use as mouth washes or gargles are inferior to the product of my invention. Furthermore, such solutions when used as gargles for the treatment of throat affections are ineffective because it has been amply demonstrated that the throat tissues cannot be effectively reached by the act of gargling.

For similar reasons, direct so-called solutions of acetyl salicylic acid, however used, whether applied by brush or spray or other means, give results which are inferior to those obtained by my invention.

Although acetyl salicylic acid commences to decompose at a temperature of 248° F. when it is heated, it does not melt until the temperature of approximately 270° F. is reached.

I have found by experimentation that it is entirely practicable to incorporate acetyl salicylic acid in a hot melt of sugar at a temperature below the decomposition point of the ester acetyl salicylic acid—namely—248° F., and of a sufficiently high temperature—approximately 200° F.—at which point acetyl salicylic acid ester may be dissolved in the hot melt of sugar in a practically dry state.

By way of illustration of the invention it may be mentioned that one may take three parts by weight of sucrose and one part by weight of glucose, and a sufficient amount of water to make a heavy syrupy solution, and cook this material by evaporation of water to a point where it becomes a hot plastic molten mass, practically deprived of its moisture content. Between the temperatures of 200° and 248° F. acetyl salicylic acid in a finely powdered state is incorporated in the hot mass and thoroughly mixed by mechanical means until the acetyl salicylic acid goes into solution in this mass. When the product is cooled the solidified sugar mass has the appearance of a nearly transparent mass. It is to be understood that the invention is not restricted to this particular way of carrying it out, as changes and modifications can be made without departing from the spirit or scope of the invention.

The acetyl salicylic acid in the form described is thus protected against decomposition or hydrolysis by reason of the protective glass-like structure of solid sugar having a low moisture content and the cough drops made in this way or from this product are very pleasing to the taste and soothing to the tissues.

This invention therefore enables acetyl salicylic acid to be incorporated in a hard sugar base in such manner as to be ideally suited for purposes of manufacturing soluble drops which are very useful in the treatment of sore throats and inflamed mucous surfaces. The cough drops may be made from the products in any of the known suitable ways.

In carrying out this invention other appropriate medication such as might be found useful as a cough drop, as well as a medication for irritated and sore throats can be combined or incorporated with the acetyl salicylic acid ester in the sugar base.

Also, in carrying out this invention, sugars or mixtures of sugars other than sucrose or glucose, such as invert sugars—fructose—maltose—galactose—and other appropriate combinations may be used where acetyl salicylic acid ester or this ester with other medicinal ingredients can be incorporated in a sugar base in a manner similar to that described above, without hydrolysis of the ester.

Tests that have been made indicate that a small amount of water, say up to about 2%, may be present in the sugar melt when the acetyl salicylic acid is introduced without causing very noticeably deleterious effects. The acetyl salicylic acid appears to become completely dissolved in the sugar melt without undergoing appreciable decomposition at temperatures of about 200° F. to 248° F. The temperature should preferably be maintained within this range while the acetyl salicylic acid is present until the molten mass becomes almost clear or transparent showing that the acetyl salicylic acid has become dissolved.

In the appended claims, the term "sugar" is to be understood to include any suitable sugar or any suitable combination of sugars.

I claim:

1. A solution of acetyl salicylic acid in sugar that is substantially free from water.

2. A solution of acetyl salicylic acid in sucrose that is substantially free from water.

3. A solid solution of acetyl salicylic acid in sugar substantially free from water, said acid being substantially free from decomposition products of the acid.

4. A solid solution of acetyl salicylic acid in a mixture of sucrose and glucose substantially free from water, said acid being substantially free from decomposition products of the acid.

5. The process which comprises melting sugar, removing substantially all water therefrom, and dissolving acetyl salicylic acid in the molten mass at a temperature not exceeding about 248° F. after the introduction of the acid.

6. The process which comprises melting sugar, removing substantially all water therefrom, and dissolving acetyl salicylic acid in the molten mass at a temperature between the limits of about 200° F. and about 248° F. after the introduction of the acid.

7. The process which comprises melting a mixture of sucrose and glucose, removing substantially all water therefrom, and dissolving acetyl salicylic acid in the molten mass at a temperature not exceeding about 248° F. after the introduction of the acid.

EDWARD C. MERRILL.